(No Model.)
S. F. COLLINS & G. S. SLACK.
THERMOSTATIC DRAFT REGULATOR.
No. 406,704. Patented July 9, 1889.
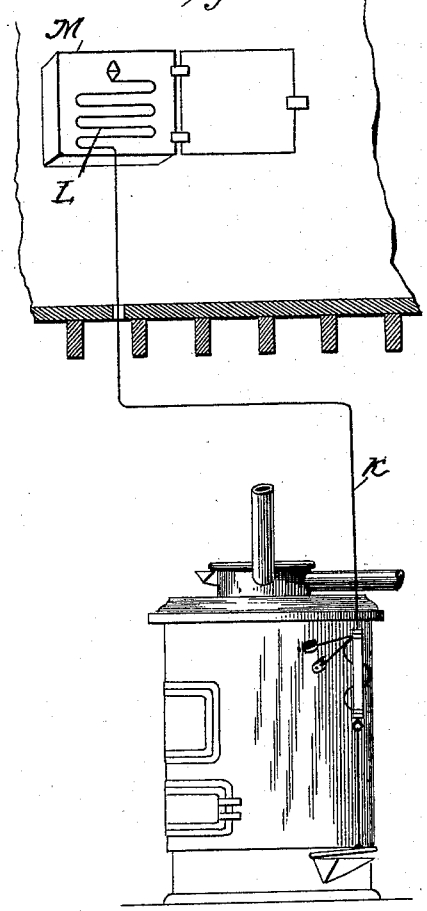
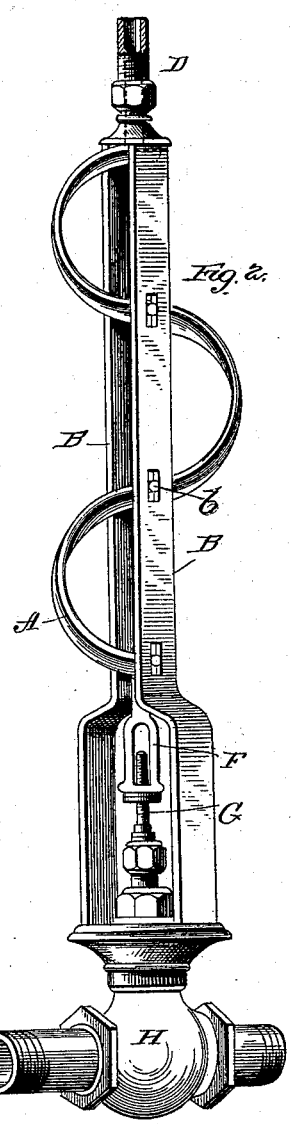
Attest
Walter Donaldson
F. L. Middleton
Inventor
Sam'l. F. Collins
Graham S. Slack
by Ellis Spear
Atty.

UNITED STATES PATENT OFFICE.

SAMUEL F. COLLINS AND GRAHAM S. SLACK, OF BINGHAMTON, NEW YORK.

THERMOSTATIC DRAFT-REGULATOR.

SPECIFICATION forming part of Letters Patent No. 406,704, dated July 9, 1889.

Application filed October 16, 1888. Serial No. 288,268. (No model.)

*To all whom it may concern:*

Be it known that we, SAMUEL F. COLLINS and GRAHAM S. SLACK, of Binghamton, in the county of Broome and State of New York, have invented a new and useful Improvement in Draft-Regulators; and we do hereby declare that the following is a full, clear, and exact description of the same.

Our invention is designed to regulate the temperature in houses and other places wherever it is desirable to maintain a uniform temperature, and it may be used as a draft-regulator and thus regulate the temperature, or it may be in connection with the valve of a steam or hot air supply pipe and thus regulate the temperature by opening or closing the valve within said pipe.

Our invention consists of a regulator in connection with the valve or damper and adapted to operate the same to increase or diminish the supply of heat, said regulator comprising a tube suitably supported in a sinuous or spiral form and containing or in connection with an expansible material, whereby the said spring is contracted or distended according to the condition of the temperature acting upon the material within the tube, and the valve or damper thereby automatically regulated.

In the drawings, Figure 1 represents the the invention as applied to a boiler to regulate the draft thereof, and Fig. 2 is a detail perspective view of the regulator.

In Fig. 2 the pipe H represents the steam or hot-air pipe with the valve to which the regulator is connected. The regulator is shown at A, and is a tube composed of spring-metal and supported upon standards B B by means of guide-pins *b* or projections fitting in slots formed in the standards. The regulator is bent in sinuous form, and is shown as having three bends and three supports upon each side in the standards. It will be understood, however, that any number of bends or curves may be provided and an equal number of bearing-points. A filling-nozzle or extension D at the top of the standards is in connection with a tube, so that it may thus be filled with the expansible liquid or gas or whatever may be used. The lower end is closed, and is connected with a yoke F, which has an opening in its lower part internally screw-threaded, and within this opening fits the upper end of the screw G, which is connected to the spindle of the valve within the pipe H.

In order to regulate the amount of steam or hot air passing through the pipe it is only necessary to fill the tube A with expansible material and then regulate its connection with the valve-stem by means of the threaded yoke described, and thus a regular temperature will be maintained, as when the temperature increases or diminishes the contents of the tube A will expand and will distend the coils thereof and close the valve through its stem G, which, it will be understood, fits in a steam-tight box. This will close the valve according to the amount of expansion, and as soon as the temperature is reduced the coils will contract and the valve be opened.

It will be understood, of course, that the regulator must be in the room or place in which it is desired to regulate the temperature, or must be in connection therewith.

In Fig. 1 we have shown the regulator attached to a damper so as to control the draft to a steam-heating boiler. A simple adjustable connection is formed between the end of the tube A and the damper, by means of which the regulator may be set to keep the temperature at a certain point. In this case a coil L is shown inclosed in a case M in the room in which the temperature is to be regulated, and this coil is in connection with the regulator by means of a connecting-tube K. The determined temperature may be arranged for by the adjustable connection between the regulator and damper, and the liquid or gas in the coil and tube will operate the spiral under any change in the temperature of the room in which the coil is placed. It will be understood that it is not necessary that the regulator should be in direct proximity to the valve or damper, as it may be placed at any distance and suitably connected thereto.

We have found by experiment that by the use of a spring-tube when the pressure is applied internally by the expansion of the liquid, the outside curve of the tube having more surface than the inside, the tendency of the internal pressure is to elongate the tube, and as this elongation is freely permitted by the slotted connection with the standard the force of the spring is exerted upon the valve-stem or damper.

We do not limit ourselves to the use of any particular material as an expansive agent, as gases or liquid may be used as found most convenient or effective. In some conditions—as, for instance, when applied to an incubator—the coil or tube may be in connection with the lamp ordinarily used, so as to regulate the amount of heat by controlling the wick.

We claim as our invention—

1. A regulator for maintaining the temperature at a determined point, consisting of a tube arranged in sinuous form, a suitable support, suitable guides to control the movement of the tube and cause its lower end to move in approximately a straight line, a connection from one end of said tube to the valve or damper, and an opening to the interior of said tube for filling the same, substantially as described.

2. A regulator consisting of a tube bent in sinuous form and having movable supports between the bends, connection between one end and the valve or damper, said tube containing or being in connection with an expansible material, substantially as described.

3. A regulator consisting of a tubular spring bent in sinuous form with movable supports therefor, and an adjustable connection between one end of said tube and a valve or damper, said tube containing or being in connection with an expansible material, substantially as described.

In testimony whereof we have signed our names to this specification in the presence of two subscribing witnesses.

SAMUEL F. COLLINS.
GRAHAM S. SLACK.

Witnesses:
E. M. DAVIS,
E. A. SMITH.